United States Patent
Wakabayashi

(10) Patent No.: US 8,600,439 B2
(45) Date of Patent: Dec. 3, 2013

(54) MOBILE ELECTRONIC DEVICE, CRADLE, METHOD FOR OPERATING A MOBILE ELECTRONIC DEVICE, AND COMMUNICATION SYSTEM

(75) Inventor: Taichi Wakabayashi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 151 days.

(21) Appl. No.: 12/914,931

(22) Filed: Oct. 28, 2010

(65) Prior Publication Data

US 2011/0098068 A1   Apr. 28, 2011

(30) Foreign Application Priority Data

Oct. 28, 2009 (JP) ................. 2009-248321

(51) Int. Cl.
*H04B 1/38* (2006.01)

(52) U.S. Cl.
USPC ...... 455/557; 455/556.1; 455/41.1; 455/41.2; 455/573; 455/572

(58) Field of Classification Search
USPC ............. 455/557, 556.1, 41.1, 41.2, 573, 572
See application file for complete search history.

(56) References Cited

U.S. PATENT DOCUMENTS

| | | | |
|---|---|---|---|
| 2003/0129978 A1* | 7/2003 | Akiyama et al. | 455/426 |
| 2005/0181839 A1* | 8/2005 | Tiainen et al. | 455/573 |
| 2009/0031069 A1* | 1/2009 | Habuto et al. | 710/303 |
| 2009/0059907 A1* | 3/2009 | Sindhwani et al. | 370/354 |
| 2009/0312046 A1* | 12/2009 | Clevenger et al. | 455/522 |
| 2010/0031295 A1* | 2/2010 | Krzyzanowski et al. | 725/52 |
| 2010/0197357 A1* | 8/2010 | Kawasaki et al. | 455/566 |
| 2011/0136541 A1* | 6/2011 | Chang et al. | 455/558 |
| 2012/0117616 A1* | 5/2012 | Kirkup et al. | 726/1 |

FOREIGN PATENT DOCUMENTS

| | | |
|---|---|---|
| JP | 2009-135631 | 6/2009 |
| JP | 2009-164924 | 7/2009 |
| JP | 2009-164925 | 7/2009 |
| JP | 2009-165005 | 7/2009 |

* cited by examiner

*Primary Examiner* — Barry Taylor
(74) *Attorney, Agent, or Firm* — Procopio, Cory, Hargreaves & Savitch LLP

(57) ABSTRACT

A method for operating a mobile electronic device is disclosed. The mobile electronic device communicates through a power-line carrier communication network, if the mobile electronic device is charging at a charging cradle. The mobile electronic device communicates through a base station, if the mobile electronic device is not charging at the charging cradle.

15 Claims, 6 Drawing Sheets

MOBILE ELECTRONIC DEVICE, CRADLE, METHOD FOR OPERATING A MOBILE ELECTRONIC DEVICE, AND COMMUNICATION SYSTEM

CROSS-REFERENCE TO RELATED APPLICATION

The present application claims priority under 35 U.S.C. §119 to Japanese Patent Application No. 2009-248321, filed on Oct. 28, 2009, entitled "A mobile electronic device and a cradle". The content of which is incorporated by reference herein in its entirety.

FIELD

Embodiments of the present disclosure relate generally to mobile electronic devices, and more particularly relate to a mobile electronic device, cradle, method for operating a mobile electronic device and communication system.

BACKGROUND

Power-line communications systems/networks generally operate by modulating a carrier signal on a wiring system. Power-line communications systems/networks may use a variety of frequency bands according to transmission characteristics of the wiring system. Power-line communications systems/network may comprise data rates of, about 100 bps, about 100 kbps, 10 mbps, and the like. The wiring system may comprise, for example but without limitation, household electrical plugs that communicate with the internet, and the like.

SUMMARY

A mobile electronic device is disclosed. A first communication module of the mobile electronic device communicates with a base station, and a second communication module of the mobile electronic device communicates with a power line carrier communication network. A charging circuit supplies power from an external power source to charge a battery of the mobile electronic device, and a control module controls charging of the second communication module and the battery. The control module communicates with the power-line carrier communication network through the second communication module during charging, and with the base station through the first communication module otherwise.

In a first embodiment, a mobile electronic device comprises, a first communication module operable to communicate with a base station when not being supplied with power from an external power source. The mobile electronic device also comprises a second communication module operable to communicate with a power-line carrier communication network when being supplied with power from the external power source. The mobile electronic device further comprises a battery, and a charging circuit operable to supply power from the external power source to the battery and to the second communication module. The mobile electronic device also comprises a control module operable to control charging of the battery and the second communication module.

In a second embodiment, a mobile electronic device comprises a first communication module operable to communicate information signals with a base station and a second communication module operable to transmit and receive the information signals via modulation over a current supplied from an external power source. The mobile electronic device also comprises a battery operable to be charged by the current. The mobile electronic device further comprises a control module operable to transmit and receive the information signals through the second communication module when the battery is charged by the current, and communicate through the first communication module when the battery is not charged by the current.

In a third embodiment, a cradle for a mobile electronic device, comprises a supporting module operable to support a mobile electronic device, and cradle charging circuit operable to supply power from an external power source to a battery of the mobile electronic device. The cradle further comprises a cradle communication module operable to communicate with the mobile electronic device, and a plug operable to couple with a power system and a power-line carrier communication main unit located at the power system.

In a fourth embodiment, a method operates a mobile electronic device by communicating through a power-line carrier communication network, if the mobile electronic device is charging at a charging cradle, and by communicating through a base station, if the mobile electronic device is not charging at the charging cradle.

In a fifth embodiment, a communication system comprises a mobile electronic device and a cradle for the mobile electronic device. The cradle comprises a supporting module operable to support the mobile electronic device, a cradle charging circuit operable to supply power from an external power source to the mobile electronic device, a cradle communication module operable to communicate with the mobile electronic device, and a plug operable to couple with an power-line carrier communication main unit through an outlet terminal. The mobile electronic device comprises a first communication module operable to communicate with a base station when not being supplied with power from the external power source through the cradle, a second communication module operable to communicate with the power-line carrier communication network through the cradle communication module when being supplied with power from the external power source through the cradle, a battery, a charging circuit operable to supply power from the external power source through the cradle to the battery and to the second communication module, and a control module operable to control charging of the battery and the second communication module.

In a sixth embodiment, a communication system comprises a mobile electronic device, a cradle for the mobile electronic device, and a power-line carrier communication main unit. The cradle comprises a supporting module operable to support the mobile electronic device, a cradle charging circuit operable to supply power from an external power source to the mobile electronic device, a cradle communication module operable to communicate with the mobile electronic device, and a plug operable to couple with the power-line carrier communication main unit through an outlet terminal. The mobile electronic device comprises a first communication module operable to communicate with a base station when not being supplied with power from the external power source through the cradle, a second communication module operable to communicate with the power-line carrier communication network through the cradle communication module when being supplied with power from the external power source through the cradle, a battery, a charging circuit operable to supply power from the external power source through the cradle to the battery and to the second communication module, and a control module operable to control charging of the battery and the second communication module.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, a mobile phone. Embodiments of the disclosure, however, are not limited to such mobile phone, and the techniques described herein may also be utilized in other applications. For example, embodiments may be applicable to digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

A mobile phone such as a cell phone communicates with a base station within a specific radio wave band frequency; therefore, there is a risk that radio resources within a radio wave band frequency may be limited. Selecting the communications means according to embodiments of the disclosure reduces demand on the radio resources.

Figure 1:
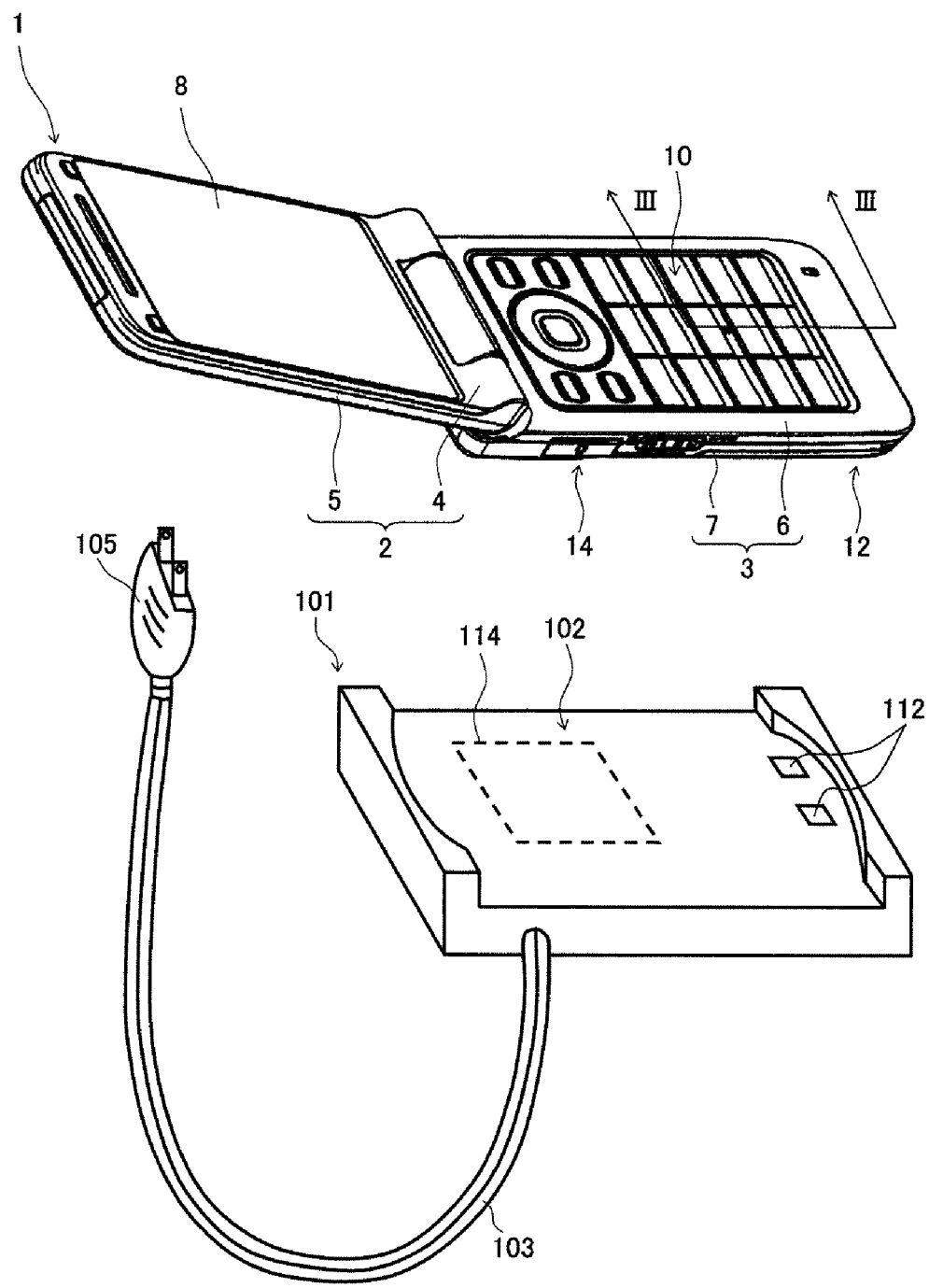
FIG. 1 is an illustration of an exemplary perspective outer view of a cell phone showing a cradle according to an embodiment of the disclosure.

FIG. 1 is an illustration of an exemplary perspective outer view of a cell phone 1 showing a cradle 101 according to an embodiment of the disclosure. The cell phone 1 is a folding cell phone comprising a first housing 2 and a second housing 3. The first housing 2 comprises a first housing front case 4 facing the second housing 3 in a folded state, and a first housing rear case 5 comprising a part opposite to the second housing 3 in a folded state. The second housing 3 comprises a second housing front case 6 comprising a part facing the first housing 2 in a folded state, and a second housing rear case 7 comprising a part opposite to the first housing 2 in a folded state. The first housing front case 4 and the first housing rear case 5 are coupled to each other, for example, via a screw, and the like. Various electronic members are contained in a space formed between the first housing front case 4 and the first housing rear case 5. The second housing front case 6 and the second housing rear case 7 are also coupled to each other for example, via a screw, and the like. Various electronic members are contained in a space formed between the second housing front case 6 and the second housing rear case 7.

The first housing front case 4, the first housing rear case 5, the second housing front case 6, and the second housing rear case 7, may be formed by, for example but without limitation, a resin, and the like.

In this document, a surface direction means a direction from the first housing rear case 5 towards the first housing front case 4 (the forward direction from the plane of the paper in FIG. 1). A rear surface direction means a direction from the first housing front case 4 towards the first housing rear case 5 (the backward direction from the plane of the paper in FIG. 1). Similarly, the surface direction also means the direction from the second housing front case 7 towards the second housing rear case 6 (the forward direction from the plane of the paper in FIG. 1). The rear surface direction also means the direction from the second housing front case 6 towards the second housing rear case 7 (the backward direction from the plane of the paper in FIG. 1).

The display module 8 is positioned in the surface direction of the first housing front case 4. The display module 8 comprises, for example but without limitation, a liquid crystal display (LCD), organic electro-luminescence (EL), an organic light emitting diode (OLED), and the like. Various kinds of information can be displayed on the display module 8 via an image/video signal supplied from the control module 57 (FIG. 4) such as but without limitation, a state of the cell phone 1, details of user operation, a telephone number of the destination, display of e-mail contents, game screen, date, time, remaining battery level, success and failure of the transmission, standby screen, and the like.

An input module 10 is positioned in the surface direction of the second housing front case 6. A user activates the input module 10 via input keys to input a command, input a characters, etc. to the cell phone 1. The input module 10 outputs input data from the input keys to the control module 57.

A cell phone terminal 12 exposed to the surface is positioned in the rear surface direction of the second housing rear case 7 of the second housing 3. The cell phone terminal 12 contacts with a cradle terminal 112 of the cradle 101, and is supplied with power to charge a battery 16 (FIG. 2) as described below.

A cell phone short-distance communication antenna module 14 is positioned in the rear surface direction of the second housing rear case 7 of the second housing 3.

Unlike a communication module 51 (FIG. 4) that communicates with a base station 300 (FIG. 2) within a relatively long distance therewith, the cell phone short-distance communication antenna module 14 performs a short-distance communication. The communication through the cell phone short-distance communication antenna module 14 is characterized such that more information can be communicated per unit time, compared to the communication through the communication module 51.

The cell phone short-distance communication antenna module 14 may support a particulate communication and modulation scheme, such as but without limitation, a Radio Frequency Identification (RFID), optical communication, ultrasonic communication, wired communication via terminals, and the like, to transmit and receive data signals.

The cradle 101 comprises a supporting module 102, a plug 105, a cradle terminal 112, and a cradle short-distance communication antenna module 114.

The plug 105 is located on a tip of a cord 103. The cord 103 is, for example but without limitation, an AC cord, and the like. The plug 105 may be inserted in an electrical outlet 203 for household use (FIG. 2), and the like. When the plug 105 is inserted in the outlet 203, the cradle 101 is supplied with alternating current through the cord 103. An AC/DC converter 116 (cradle charging circuit) (FIG. 2) may also be provided at the plug 105.

The supporting module 102 sets a position of the received cell phone 1, and holds/docks in place the positioned cell phone 1. Moreover, the supporting module 102 comprises a structure for releasing the held/docked cell phone 1 as necessary.

The cradle terminal 112 supplies a power to the battery 16 (FIG. 2) of the cell phone 1.

The cradle short-distance communication antenna module 114 performs information communication with the cell phone 1 through the cell phone short-distance communication antenna module 14.

Figure 2:
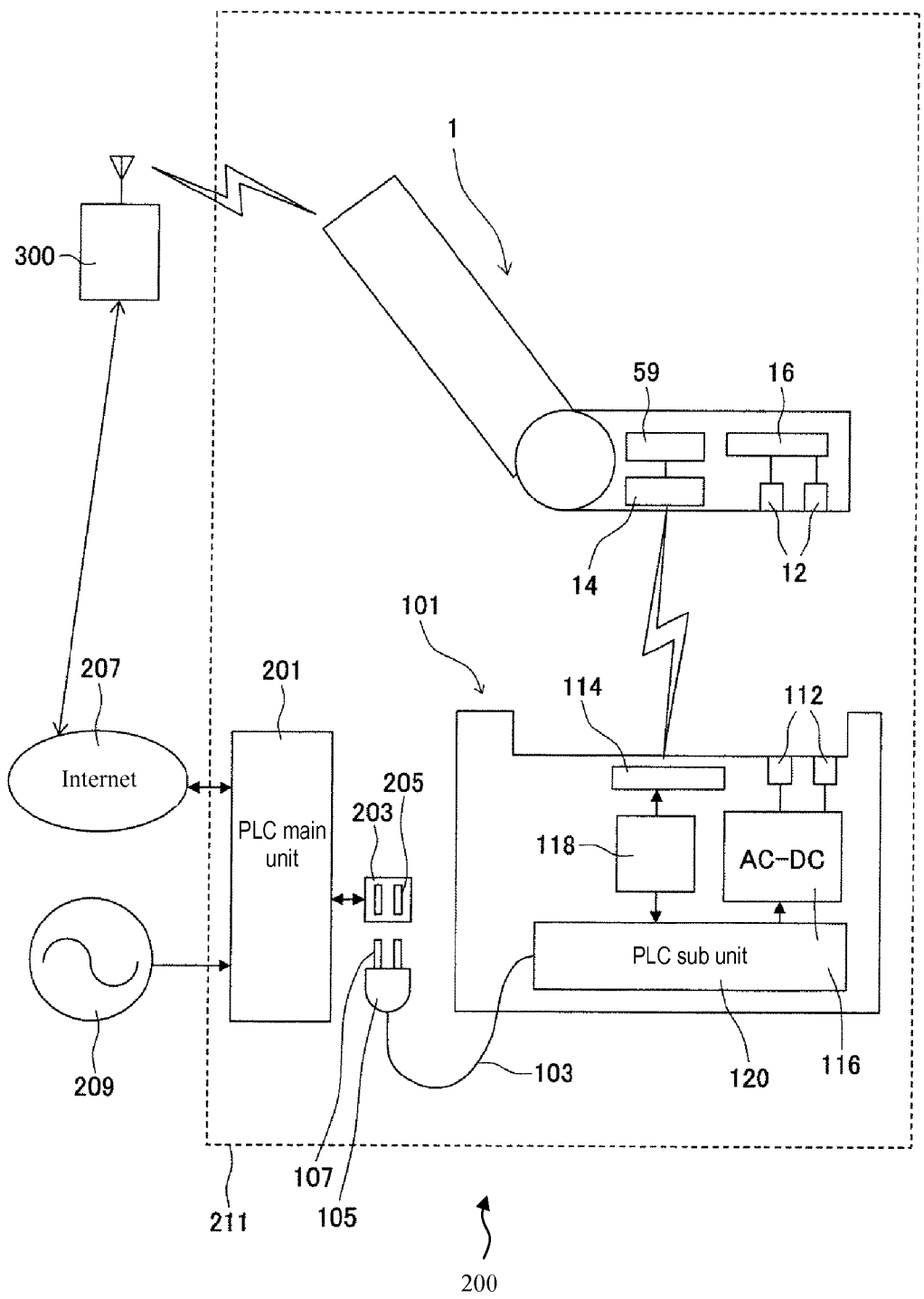
FIG. 2 is an illustration of an exemplary system according to an embodiment of the disclosure.

FIG. 2 is an illustration of an exemplary system 200 according to an embodiment of the disclosure. The system 200 comprises the cell phone 1, the cradle 101, the Internet 207, an AC source 209, a PLC main unit 201, and a base station 300. The system 200 may have functions, material, and structures that are similar to the embodiments shown in FIG. 1. Therefore common features, functions, and elements may not be redundantly described here. The cell phone 1 comprises the cell phone short-distance communication antenna module 14, a cell phone short-distance communication module 59, the cell phone terminal 12, and the battery 16.

The cell phone terminal 12 is electrically coupled to the battery 16. Electronic components (such as FET) are coupled between the cell phone terminal 12 and the battery 16.

The cell phone short-distance communication antenna module 14 and a cell phone short-distance communication module 59 are used for a short-distance communication. The cell phone short-distance communication module 59 is electrically coupled to the cell phone short-distance communication antenna module 14. The cell phone short-distance communication module 59 performs information communication with the cradle short-distance communication module 118 of the cradle 101 through the cell phone short-distance communication antenna module 14 and the cradle short-distance communication antenna module 114. The cell phone short-distance communication module 59 comprises an RFID function and/or IrDA function. In this manner, the functions provided to the cell phone 1 can be effectively utilized.

The cradle 101 comprises the cradle terminal 112, the cradle short-distance communication antenna module 114, the AC/DC converter 116, a cradle short-distance communication module 118, and a power-line carrier communication sub unit 120 (PLC client). The cradle 101 supports, for example but without limitation, a mobile electronic device, a laptop, a PDA, a game console, a camera, a tablet PC, and the like.

Power-line Communication (PLC) refers to a power-line carrier communication. The power line carrier communication comprises an indoor network established inside a house or office, and an outdoor network established in a form connecting a plurality of houses or offices.

The plug 105 is coupled to the cradle 101 through the cord 103. The plug 105 can be inserted into the outlet 203. When the plug 105 is inserted into the outlet 203, a plug terminal 107 on the plug 105 side and an outlet terminal 205 on the outlet 203 side are electrically coupled.

The outlet terminal 205 is electrically coupled to a power line carrier communication main unit 201 (PLC host).

The power-line carrier communication main unit 201 is coupled to the Internet 207, and an AC source 209 (external power source) that is commercially supplied. The Internet 207 and the AC source 209 are located outside the house 211.

The power-line carrier communication main unit 201 is coupled to the Internet 207 and the AC source 209. The power-line carrier communication main unit 201 superimposes/modulates an information signal fed from the Internet 207 with the power-line coupled to the AC source 209 as a high-frequency wave signal. Conversely, the power-line carrier communication main unit 201 separates an information signal transmitted by the power-line carrier communication sub unit 120 from the power line, and outputs it to the Internet 207. The power generated in the power-line carrier communication main unit 201 is superimposed/modulated with a high-frequency wave information signal. The power generated in the power-line carrier communication main unit 201 is supplied to the power-line carrier communication sub unit 120 through the outlet 203, the plug 105, and the cord 103. The power-line carrier communication sub unit 120 separates the power and a high-frequency component used for information communication from the power line. The separated power is supplied to the AC/DC converter 116. On the other hand, the separated high-frequency component is supplied to the cradle short-distance communication module 118. The power supplied by the power-line may be alternating current or direct current.

The power supplied to the AC/DC converter 116 is converted from alternating current to direct current, and supplied to the cradle terminal 112 as direct current.

When the cell phone 1 is received in the supporting module 102, the cradle terminal 112 couples with the cell phone terminal 12. In this manner the cell phone 1 is charged. Charging is controlled by the electronic components (such as FET).

The information signal that is a high-frequency component supplied to the cradle short-distance communication module 118 is converted to a short-distance communication signal by the cradle short-distance communication module 118. The short-distance communication signal is then sent to the cell phone 1 by the cradle short-distance communication antenna module 114 as communication radio wave. The communication radio wave sent from the cradle short-distance communication antenna module 114 is converted to an electrical signal by the cell phone short-distance communication antenna module 14. The cell phone short-distance communication module 59 converts the electrical signal to an information signal. Conversely, the information signal sent from the cell phone 1 is output to the power-line carrier communication sub unit 120 through the cell phone short-distance communication module 59, the cell phone short-distance communication antenna module 14, the cradle short-distance communication antenna module 114, and the cradle short-distance communication module 118.

The power-line carrier communication sub unit 120 superimposes the information signal with the power-line as a high-frequency wave. The signal superimposed as a high-frequency wave is output to the power-line carrier communication main unit 201. The power-line carrier communication main unit 201 separates a high-frequency component, and outputs the high-frequency component to the Internet 207 as an information signal.

Figure 3:
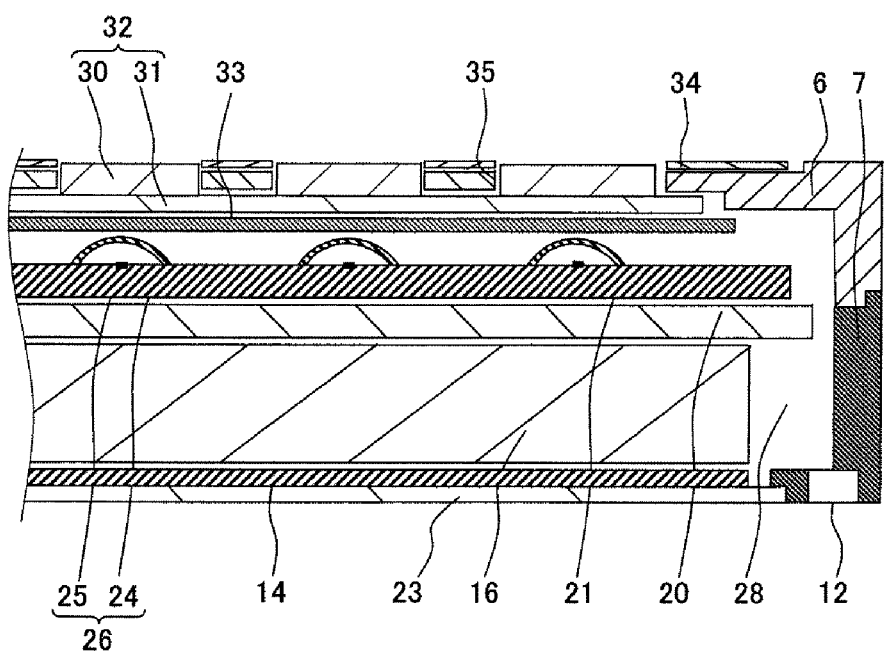
FIG. 3 is an illustration of an exemplary cross-section of the cell phone taken along line III-III of the FIG. 1.

FIG. 3 is an illustration of an exemplary cross-section of the cell phone taken along line III-III of the FIG. 1. The second housing front case 6 and the second housing rear case 7 are coupled such that their inner surfaces face each other. An internal housing 20 is placed in a space formed by the coupling. In the rear surface direction of the internal housing 20, a battery receptacle 28 is formed. The battery 16 is placed in the battery receptacle 28. The battery 16 is attached to or detached from the battery receptacle 28. The battery 16 supplies a power to the cell phone 1. A battery cover 23 is placed in the rear surface direction of the internal housing 20 such that the battery 16 can be replaced.

A printed circuit board 21 is placed in the surface direction of the internal housing 20. A switch 26 and an illuminating module are mounted on this printed circuit board 21. The switch 26 has a metal dome 24 and a fixed contact 25.

A key sheet 32 is placed in the surface direction of the printed circuit board 21. The key sheet 32 comprises a plurality of key tops 30 on which a user applies a pressure, and a rubber sheet 31 on which the plurality of key tops 30 are adhered. A plurality of key openings 35, to which the key tops 30 are inserted (arranged), are formed on the second housing front case 6.

A decorative sheet 34 is attached around the key openings 35.

A light guiding sheet 33 is placed between the key sheet 32 and the switch 26 of the printed circuit board 21.

The cell phone short-distance communication antenna module 14 is placed in the surface direction (inward direction) of the battery cover 23.

The cell phone short-distance communication antenna module 14 may be placed in the other position. For example, it may be placed within the first housing rear case 5.

The cell phone terminal 12 is arranged in the second housing rear case 7. The cell phone terminal 12 can be placed in the other position as well.

Figure 4:
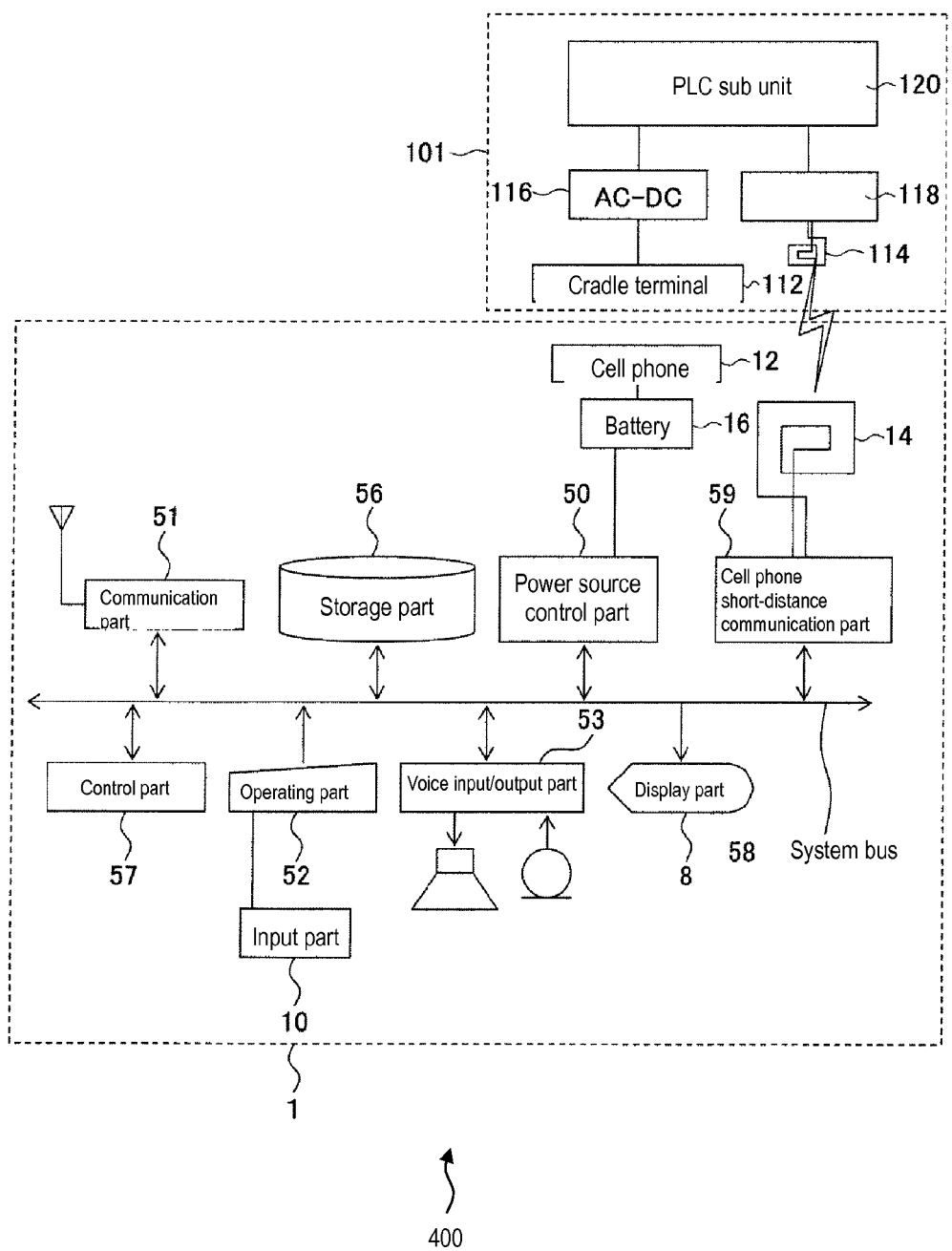
FIG. 4 is an illustration of an exemplary functional block diagram of a cell phone and a cradle according to an embodiment of the disclosure.

FIG. 4 is an illustration of an exemplary functional block diagram of the cell phone 1 (system 400) and a cradle 101 according to an embodiment of the disclosure.

The system 400 comprises a control module 57, a power source control module 50, a communication module 51, an operating module 52, an audio input/output module 53, a display module 8, a storage module 56, and a cell phone short-distance communication module 59 coupled to a common system bus 58 respectively. The common system bus 58 comprises a plurality of communication lines for transmitting or receiving data such as addresses, controlling each module of the connection destination, etc.

The power source control module 50 controls the power supply to a circuit board, etc. when the cell phone 1 is in use. The display module 8, the control module 57, etc. are mounted on the circuit board. The power source control module 50 controls a charging circuit during charging, and controls, for example but without limitation, initiation and termination of charging the battery 16, the rate of charging, and the like.

Charging of the battery 16 is performed with direct current supplied from the AC/DC converter 116 through the cell phone terminal 12 and the cradle terminal 112. The power supplied to the AC/DC converter 116 is supplied by the power-line carrier communication sub unit 120. The power-line carrier communication sub unit 120 separates a high-frequency wave, and supplies the separated high-frequency wave to the cradle short-distance communication module 118. The cell phone terminal 12 and various electronic devices that control the charging are one example of the charging circuit in the present disclosure. That is, the charging circuit in the present disclosure comprises those using a non-contact type charging method (such as electromagnetic induction).

The communication module 51 is operable to transmit and receive a plurality of communication signals comprising data signals via a base station 300. The communication module 51 communicates with the wireless network via a wireless data communication link (not shown). The communication module 51 cooperates with a base station transceiver (not shown) with a suitably configured RF antenna arrangement (not shown) that can support a particular wireless communication protocol and modulation scheme to transmit and receive the data signals. The data signals may comprise, for example but without limitation, voice data during voice communication, text data during email, web data during accessing web site, and the like. The various data comprise The operating module 52 receives a user operation input from the input module 10 and other parts.

Input module 10 comprises keys arranged thereon. The keys comprise for example but without limitation, a power key, a speaking key, number keys, character keys, direction keys, an enter key, transmission key, function key, and the like, having various functions respectively. When these keys are operated by a user, a signal corresponding to details of that operation is generated, and sent to the control module 57 as an instruction from the user.

The audio input/output module 53 performs input/output processing of audio signals output from a speaker and audio signals input from a microphone. That is, the audio input/output module 53 amplifies the audio input from the microphone, converts it to a digital audio data by performing analog/digital conversion as well as performing signal processing such as encoding, and outputs it to the control module 57. Moreover, the audio input/output module 53 performs a signal processing such as decoding, digital/analog conversion, amplification, etc. on the audio data supplied from the control module 57 to convert it to an analog audio data and output it to the speaker.

The storage module 56 may be any suitable data storage area with suitable amount of memory that is formatted to support the operation of the cell phone 1. The storage module 56 is configured to store, maintain, and provide data as needed to support the functionality of the cell phone 1 in the manner described below. In practical embodiments, the storage module 56 may comprise, for example but without limitation, a non-volatile storage device (non-volatile semiconductor memory, hard disk device, optical disk device, and the like), a random access storage device (for example, SRAM, DRAM), HDD, or any other form of storage medium known in the art. The storage module 56 stores, for example but without limitation, a computer program to be executed by the control module 57, an address book for managing personal information such as a phone number, e-mail address, etc. of the other person who is communicated with, an audio file for playing a ring alert or alarm, an image file for the standby screen, various setting data, temporary data used in the course of program processing, etc. The storage module 56 also stores files for which downloading is completed. The storage module 56 may be coupled to the control module 57 such that the control module 57 can read information from and write information to the storage module 56. As an example, the control module 57 and storage module 56 may reside in their respective ASICs. The storage module 56 may also be integrated into the control module 57. In an embodiment, the storage module 56 may comprise a cache memory for storing temporary variables or other intermediate information during execution of instructions to be executed by the control module 57.

The cell phone short-distance communication module 59 can communicate with the cradle short-distance communication module 118 through the cell phone short-distance communication antenna module 14 and the cradle short-distance communication antenna module 114.

The cell phone short-distance communication module 59 and the cradle short-distance communication module 118, can communicate, for example but without limitation, via the radio wave as mentioned above, infrared communication, optical communication, wired communication, ultrasonic communication, and the like. The cradle short-distance communication module 118 receives and transmits information signals via modulation over a current supplied from the external power source 209 (FIG. 2).

The control module 57 is configured to support functions of the cell phone 1. For example, the control module 57 may control operations of the cell phone 1 so that processes of the cell phone 1 are suitably performed. For example, the control module 57 controls the operation of cell phone 1 such that various processing of the cell phone 1 is performed through an appropriate procedure according to, for example but without limitation, the operation of the operating module 52. These operations may comprise, for example but without limitation, audio telephone call carried out through a line switching network, creation and transmission/reception of e-mails, viewing a download site on the Web of the Internet, control of input/output signals to/from the input keys and the like. Furthermore, the control module 57, controls operations of, for example but without limitation, transmission/reception of signals by the communication module 51, display of images by the display module 8, and the like. etc. Moreover, the control module 57 is equipped with a computer (microprocessor) for executing processes based on a program (operating system, application program, etc.) stored in the storage module 56. The computer executes the above-mentioned processing according to a procedure instructed by this program. That is, the control module 57 sequentially receives a command code from a program such as operating system and application program stored in the storage module 56, and executes a processing. In an embodiment, when communication is desired, the control module 57 determines whether the communication is to be performed using the communication module 51, or the communication is to be performed using the cell phone short-distance communication module 59.

The control module 57, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the control module 57 comprises processing logic that is configured to carry out the functions, techniques, and processing tasks associated with the operation of cell phone 1.

Figure 5:
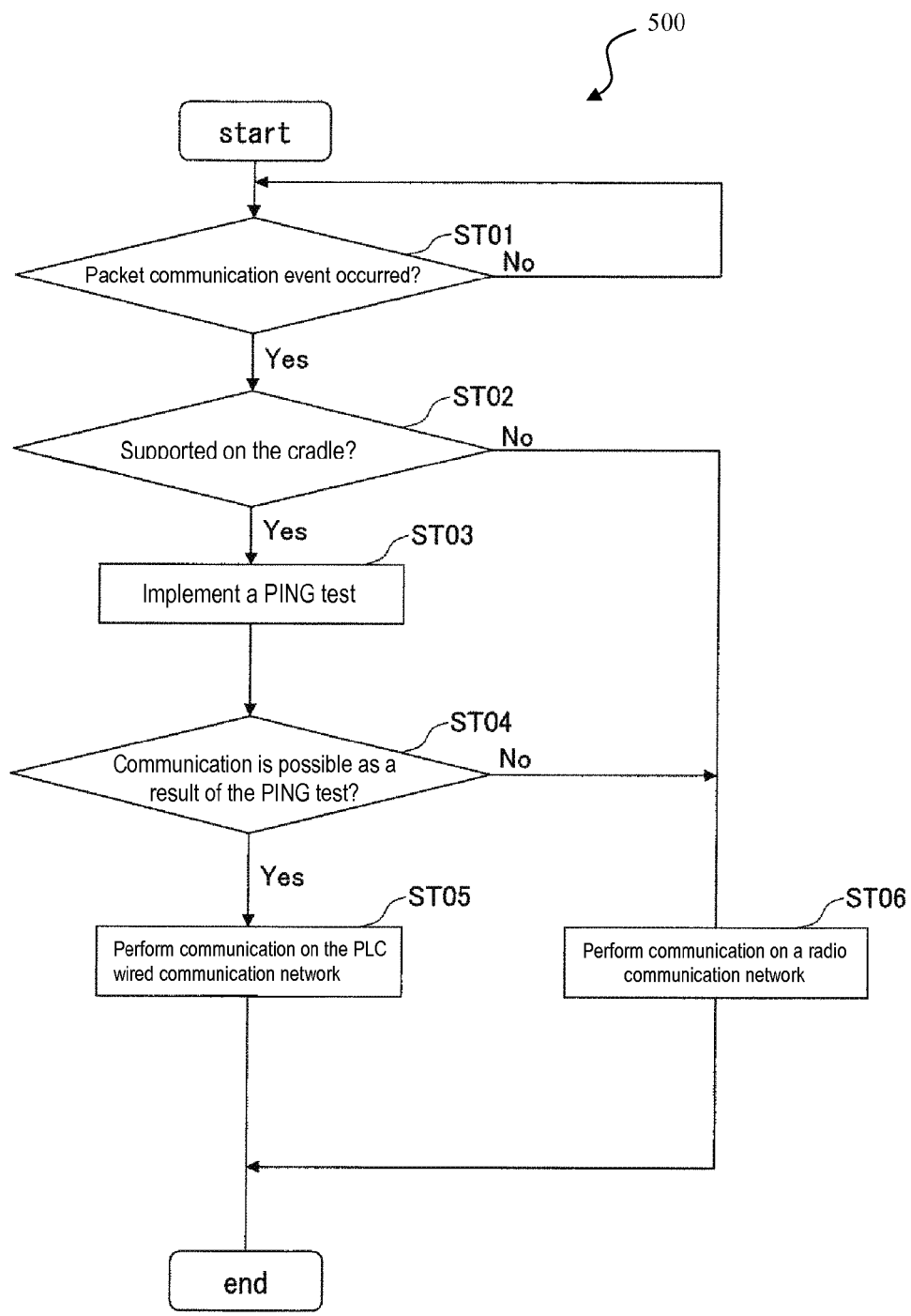
FIG. 5 is an illustration of an exemplary flow chart showing a process of selecting communication means according to an embodiment of the disclosure.

FIG. 5 is an illustration of an exemplary flow chart showing a process of determining communication means according to an embodiment of the disclosure. The various tasks performed in connection with the process 500 may be performed by software, hardware, firmware, a computer-readable medium having computer executable instructions for performing the process method, or any combination thereof. The process 500 may be recorded in a computer-readable medium such as a semiconductor memory, a magnetic disk, an optical disk, and the like, and can be accessed and executed, for example, by a CPU such as the control module 57 in which the computer-readable medium is stored. It should be appreciated that process 500 may include any number of additional or alternative tasks, the tasks shown in FIG. 4 need not be performed in the illustrated order, and process 500 may be incorporated into a more comprehensive procedure or process having additional functionality not described in detail herein. For illustrative purposes, the following description of process 500 may refer to elements mentioned above in connection with FIGS. 1-4. In practical embodiments, portions of process 500 may be performed by different elements of the cell phone 1 for example the control module 57, the power source control module 50, the communication module 51, the operating module 52, the audio input/output module 53, the display module 8, the storage module 56, a cell phone short-distance communication module 59, etc. The process 500 may have functions, material, and structures that are similar to the embodiments shown in FIGS. 1-3. Therefore common features, functions, and elements may not be redundantly described here.

Process 500 may begin by the control module 57 determining whether a packet communication event occurred (inquiry task ST01). If the packet communication event does not occur (NO branch of inquiry task ST01), process 500 leads back to task ST01. However, if the packet communication event occurred (YES branch of inquiry task ST01), the control module 57 determines whether the cell phone 1 is supported on the cradle 101 (inquiry task ST02). This is because when the cell phone 1 is not supported on the cradle 101, the power-line carrier communication (PLC) cannot be performed by the cradle short-distance communication module 118 and the cell phone short-distance communication module 59.

If the cell phone is not supported on the cradle 101 (NO branch of inquiry task ST02), the control module 57 performs a radio communication using the communication module 51 (task ST06). However, if the cell phone 1 is supported on the cradle 101, the control module 57 performs a PING (Packet INternet Groper) test (step ST03). The control module 57 then sends a confirmation signal to a predetermined server to determine whether a power-line carrier communication (PLC) can be performed by the cradle short-distance communication module 118 and the cell phone short-distance communication module 59 (inquiry task ST04). The predetermined server returns information regarding the possibility of communication to the control module 57. If it is determined that communication is possible based on the packet communication test results (the PING test) (YES branch of task ST04) the control module 57 performs a power-line carrier communication (Task ST05). However, if the communication is not possible, as a result of the PING test (NO branch of task ST04) the control module 57 performs a radio communication using the communication module 51 (task ST06).

In this way, the cell phone 1 can appropriately select a radio communication with the base station 300 through the communication module 51 or a power-line carrier communication through the cell phone short-distance communication module 59 (short-distance wireless communication module 59). Since an appropriate communication method can be selected, demand on the radio resource (bandwidth) in a radio wave band frequency due to the communication between the communication module 51 and the base station 300 is reduced. Therefore, the throughput is improved.

Additional service charges may be applied to the radio communication with the base station 300 through the communication module 51. By preferentially utilizing a power-line carrier communication in which any additional service charges are not applied, the occurrence of the additional service charges can be reduced. Moreover, since a power-line carrier communication can be utilized, high volume data can be transmitted or received smoothly. Thus, the power-line carrier communication of the cell phone 1 is achieved appropriately.

Although as mentioned above the cell phone 1 uses the cell phone short-distance communication module 59 and cradle short-distance communication module 118 for performing a radio communication, other communication method may be alternatively employed. In this manner by having a plurality of communication means, the power-line carrier communication is achieved in a more certain manner and quickly.

For example, the cell phone 1 may use an infrared communication (IrDA) for performing an communication as explained below.

Figure 6:
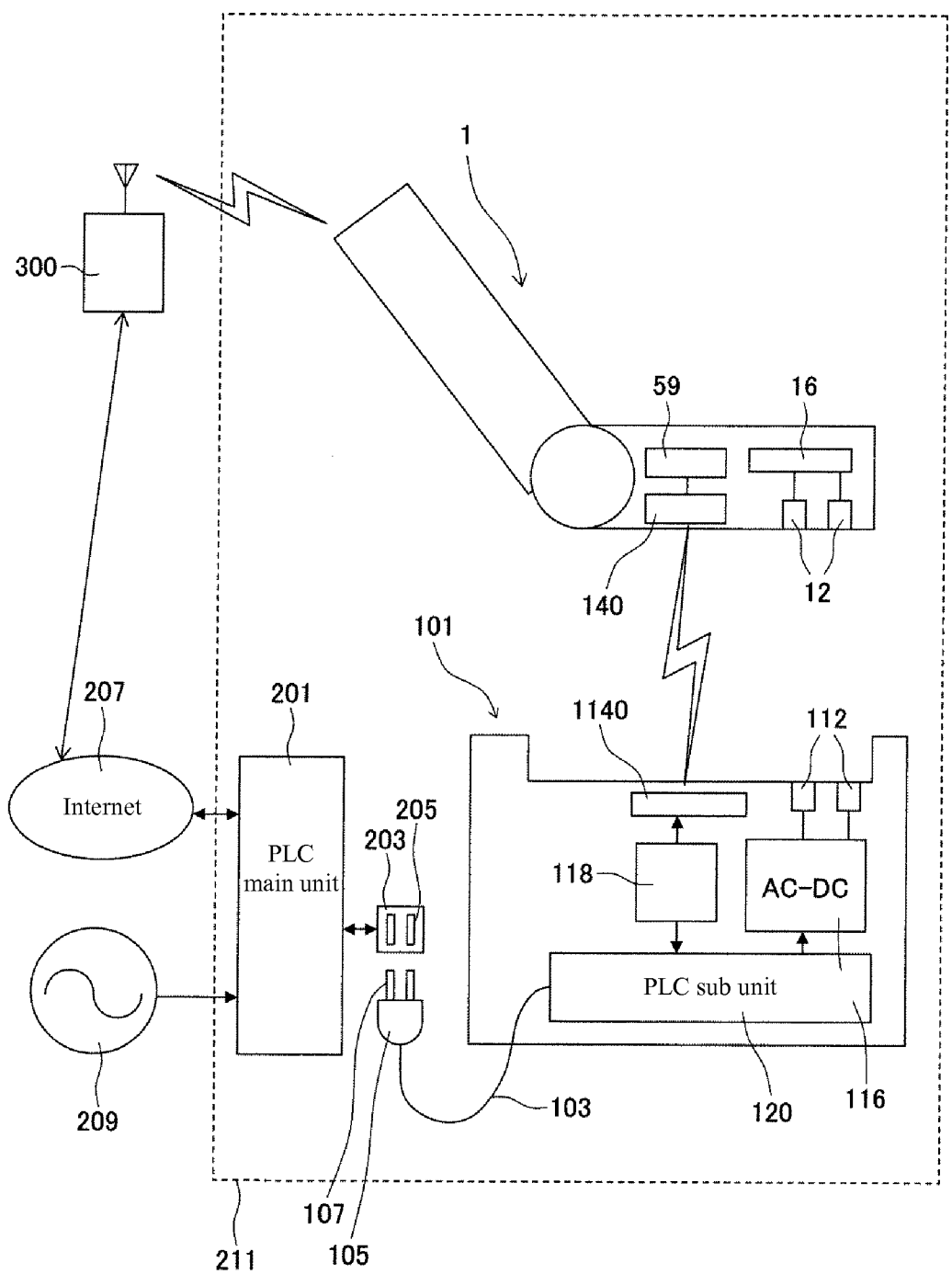
FIG. 6 is an illustration of an exemplary system for performing communication through an infrared communication (IrDA) according to an embodiment of the disclosure.

FIG. 6 is an illustration of an exemplary configuration for performing communication through an IrDA according to an embodiment of the disclosure. The system 200 may have functions, material, and structures that are similar to the embodiments shown in FIG. 1. Therefore common features, functions, and elements may not be redundantly described here. As shown in FIG. 6, a cell phone short-distance communication IrDA transceiver module 140 is used instead of the cell phone short-distance communication module 59. In addition, a cradle short-distance communication IrDA transceiver module 1140 is used in place of the cradle short-distance communication module 118. Thus, the short-distance communication is performed by infrared ray. Alternatively, the cell phone 1 may perform an infrared communication, in addition to a radio communication.

Moreover, when the radio wave is in a poor condition (signal strength is low), the power-line carrier communication may precede the radio wave communication.

Furthermore, the cell phone 1 may select a more secure communication method when important information such as a personal identification number is contained. For example, since the radio wave communication can be received by anyone in nature, more advanced encryption has often been applied. Therefore, the cell phone 1 selects a radio wave communication when important information such as a personal identification number is contained.

In addition, the cell phone 1 can also determine, according to a remaining level of the battery 16, whether the communication module 51 is to be used for communication, or the cell phone short-distance communication module 59 is to be used for communication. For example, the cell phone 1 performs communication through the communication module 51 when the remaining level of the battery 16 is less than or equal to a predetermined value, and performs communication through the cell phone short-distance communication module 59 when the remaining level of the battery 16 is more than or equal to a predetermined value. In this manner, the cell phone 1 can perform faster communication when the remaining level of the battery 16 is high.

The control module 57 performs information communication through the power-line carrier communication network through the short-distance communication of the cell phone short-distance communication module 59, when power is supplied from the AC source 209. The control module 57 performs information communication using the communication module 51 when the cell phone 1 is not supplied with a power from the AC source 209 (external power supply). In this manner, the cell phone 1 comprises two lines, i.e., the radio wave communication with the base station 300 by the communication module 51, and the power-line carrier communication with the network by the cell phone short-distance communication module 59. That is, the cell phone 1 can select more appropriate communication method. Since an appropriate communication method can be selected, the pressure on the radio resources in a radio wave band frequency due to the communication between the communication module 51 and the base station 300 is reduced. Therefore, the throughput improves.

While at least one exemplary embodiment is presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device comprising:
   a first communication module operable to communicate with a base station only when not being supplied with power from an external power source;
   a second communication module operable to wirelessly communicate with a power-line carrier communication network only when being supplied with power from the external power source, wherein the first communication module ceases communicating with the base station when power is supplied from the external power source;
   a battery;
   a charging circuit operable to supply power from the external power source to the battery and to the second communication module; and
   a control module operable to control charging of the battery from the external power source and control supply of power to the second communication module.

2. The mobile electronic device according to claim 1, wherein the second communication module communicates with the power-line carrier communication network through short-distance communication.

3. The mobile electronic device according to claim 2, wherein the second communication module comprises at least one of the group consisting of: an RFID function, and an IrDA function.

4. The mobile electronic device according to claim 1, wherein the second communication module communicates with the power-line carrier communication network, if a packet communication test result indicates that information communication is possible through the second communication module.

5. The mobile electronic device according to claim 1, wherein the first communication module communicates with the base station if a packet communication test result indicates that information communication is not possible through the second communication module.

6. The mobile electronic device according to claim 1, wherein:
   communication is performed through the first communication module; and
   communication is also performed through the second communication module, if a remaining level of the battery is greater than or equal to a predetermined value.

7. A cradle for a mobile electronic device, comprising:
   a supporting module operable to support the mobile electronic device;
   a cradle charging circuit operable to supply power from an external power source to a battery of the mobile electronic device;
   a cradle communication module operable to wirelessly communicate with the mobile electronic device only when supplying power from the external power source to the battery of the mobile electronic device, wherein the mobile electronic device does not communicate with any other communication module when power is supplied from the external power source; and
   a plug operable to couple with an outlet terminal and a power-line carrier communication main unit coupled to the outlet terminal.

8. The cradle for a mobile electronic device according to claim 7, wherein the cradle comprises a power-line carrier communication sub unit operable to communicate with the power-line carrier communication main unit through the outlet terminal.

9. The cradle for a mobile electronic device according to claim 7, wherein the cradle communication module comprises a short-distance communication module.

10. A method for operating a mobile electronic device, comprising:
    communicating through a power-line carrier communication network, only if the mobile electronic device is charging at a charging cradle; and
    communicating through a base station, if the mobile electronic device is not charging at the charging cradle, wherein communication with the base station ceases when the mobile electronic device is charging at the charging cradle.

11. The method according to claim 10, wherein the mobile electronic device communicates with the power-line carrier communication network using a short-distance wireless communication, if the mobile electronic device is charging at a charging cradle.

12. The method according to claim 10, further comprising communicating with the power-line carrier communication network, if a packet communication test result indicates that information communication is determined to be possible.

13. The method according to claim 10, further comprising communicating with the base station, if a packet communication test result indicates that information communication is not possible.

14. A communication system, comprising:
    a mobile electronic device; and
    a cradle, wherein the cradle comprises a supporting module operable to support the mobile electronic device, a cradle charging circuit operable to supply power from an external power source to the mobile electronic device, a cradle communication module operable to wirelessly communicate with the mobile electronic device only when the cradle charging circuit is supplying power from the external power source to the mobile electronic device, and a plug operable to couple with an power-line carrier communication main unit through an outlet terminal;
    wherein the mobile electronic device comprises a first communication module operable to wirelessly communicate with a base station only when not being supplied with power from the external power source through the cradle, a second communication module operable to wirelessly communicate with the power-line carrier communication network through the cradle communication module only when being supplied with power from the external power source through the cradle, a battery, a charging circuit operable to supply power from the external power source through the cradle to the battery and to the second communication module, and a control module operable to control charging of the battery and the second communication module, wherein the first communication module ceases communicating with the base station when power is supplied from the external power source.

15. A communication system, comprising:

a mobile electronic device;

a cradle for the mobile electronic device comprising a power-line carrier communication main unit;

wherein the cradle further comprises a supporting module operable to support the mobile electronic device, a cradle charging circuit operable to supply power from an external power source to the mobile electronic device, a cradle communication module operable to wirelessly communicate with the mobile electronic device, and a plug operable to couple with the power-line carrier communication main unit through an outlet terminal;

wherein the mobile electronic device comprises a first communication module operable to wirelessly communicate with a base station only when not being supplied with power from the external power source through the cradle, a second communication module operable to wirelessly communicate with the power-line carrier communication network through the cradle communication module only when being supplied with power from the external power source through the cradle, a battery, a charging circuit operable to supply power from the external power source through the cradle to the battery and to the second communication module, and a control module operable to control charging of the battery and the second communication module, wherein the first communication module ceases communicating with the base station when power is supplied from the external power source.

\* \* \* \* \*